(12) United States Patent
Halavee et al.

(10) Patent No.: US 10,735,933 B2
(45) Date of Patent: Aug. 4, 2020

(54) COMMUNICATION MANAGEMENT AND COMMUNICATING BETWEEN A MOBILE COMMUNICATION DEVICE AND ANOTHER DEVICE

(71) Applicant: SONULAR LTD., Rehovot (IL)

(72) Inventors: Uriel Halavee, Tel Aviv (IL); Jonathan Halavee, Ramat Hasharon (IL); Arie Gavriely, Kiryat Ono (IL)

(73) Assignee: SONULAR LTD., Rehovot (IL)

( * ) Notice: Subject to any disclaimer, the term of this patent is extended or adjusted under 35 U.S.C. 154(b) by 0 days.

(21) Appl. No.: 16/538,470

(22) Filed: Aug. 12, 2019

(65) Prior Publication Data

US 2019/0364411 A1 Nov. 28, 2019

Related U.S. Application Data

(63) Continuation of application No. PCT/IL2017/051141, filed on Oct. 16, 2017, and a continuation of application No. 15/488,516, filed on Apr. 17, 2017, now Pat. No. 10,382,929.

(60) Provisional application No. 62/323,713, filed on Apr. 17, 2016.

(51) Int. Cl.
*H04W 4/80* (2018.01)
*H04M 1/725* (2006.01)
*H04M 1/60* (2006.01)
*H04M 1/737* (2006.01)

(52) U.S. Cl.
CPC .......... *H04W 4/80* (2018.02); *H04M 1/6008* (2013.01); *H04M 1/6016* (2013.01); *H04M 1/7253* (2013.01); *H04M 1/737* (2013.01)

(58) Field of Classification Search
None
See application file for complete search history.

(56) References Cited

U.S. PATENT DOCUMENTS

| 5,778,082 A | 7/1998 | Chu et al. |
| 7,529,542 B1 | 5/2009 | Chevion et al. |
| 10,187,733 B2 | 1/2019 | Schneider et al. |
| 2003/0040308 A1 | 2/2003 | Gieseke |

(Continued)

FOREIGN PATENT DOCUMENTS

| EP | 3149895 | 4/2017 |
| EP | 3189643 | 7/2017 |

(Continued)

*Primary Examiner* — German Viana Di Prisco
(74) *Attorney, Agent, or Firm* — The Roy Gross Law Firm, LLC; Roy Gross

(57) ABSTRACT

A method for communicating with a given device that is located at a given direction, the method may include transmitting a triggering signal, by a communication device and over a directional communication link; receiving, by the communication device, one or more responses to the triggering signal, wherein the one or more responses originate from one or more devices; participating in determining of whether the one or more devices comprises the given device or receiving indication about whether the one or more devices comprises the given device; and when the one or more devices comprises the given device then attempting, by the communication device, to establish communication with the given device.

11 Claims, 12 Drawing Sheets

(56) References Cited

U.S. PATENT DOCUMENTS

| | | | |
|---|---|---|---|
| 2006/0052112 A1* | 3/2006 | Baussi | G01S 19/13 |
| | | | 455/456.1 |
| 2007/0273583 A1 | 11/2007 | Rosenberg | |
| 2009/0054077 A1* | 2/2009 | Gauthier | G06F 3/014 |
| | | | 455/456.1 |
| 2011/0169947 A1* | 7/2011 | Gum | H04N 1/00307 |
| | | | 348/135 |
| 2011/0182445 A1 | 7/2011 | Atsmon et al. | |
| 2011/0287796 A1* | 11/2011 | Jain | H04W 72/046 |
| | | | 455/509 |
| 2012/0329473 A1 | 12/2012 | Ekbatani | |
| 2014/0028827 A1* | 1/2014 | Piccionielli | G06Q 30/02 |
| | | | 348/78 |
| 2014/0056172 A1 | 2/2014 | Lee et al. | |
| 2014/0141744 A1 | 5/2014 | Miluzzo et al. | |
| 2014/0160893 A1 | 6/2014 | Amm et al. | |
| 2015/0171973 A1 | 6/2015 | Luna | |
| 2015/0348403 A1 | 12/2015 | Berelejis et al. | |
| 2016/0077901 A1 | 3/2016 | Roth et al. | |
| 2016/0157284 A1 | 6/2016 | Kim et al. | |
| 2016/0353496 A1 | 12/2016 | Egendorf | |
| 2016/0358459 A1* | 12/2016 | Singhar | G08C 17/02 |
| 2016/0381148 A1 | 12/2016 | Glik et al. | |
| 2017/0293880 A1 | 10/2017 | Taylor et al. | |

FOREIGN PATENT DOCUMENTS

| | | |
|---|---|---|
| WO | 9317504 | 9/1993 |
| WO | 02073818 | 9/2002 |

\* cited by examiner

COMMUNICATION MANAGEMENT AND COMMUNICATING BETWEEN A MOBILE COMMUNICATION DEVICE AND ANOTHER DEVICE

CROSS REFERENCE

This application claims priority from U.S. patent application Ser. No. 15/488,516 filed on Apr. 17, 2017, which claims the benefit of priority from U.S. Provisional Patent Application No. 62/323,713, filed on Apr. 17, 2016, both of which are incorporated herein by reference in their entirety.

This application also claims priority from International Patent Application No. PCT/IL2017/051141 filed on Oct. 16, 2017, which is incorporated herein by reference in its entirety.

BACKGROUND

Modern life exposes people to many different wireless devices that transfer data and/or control such as cellular phones, remote controls for home and toys, satellite television, and computer keyboards and mice.

Three technologies are employed for all wireless applications: radio, other electromagnetic such as light, magnetic or electric fields and sound.

Current devices use a wide range of different wireless methods, systems and protocols, such as: long term evolution (LTE), wireless networking WI-FI™ BLUETOOTH™, near field communication (NFC) and radio frequency identification (RFID).

Wireless communication, which can be person-to-person, person to machine, machine to person and machine to machine, requires having the recipient's contact details—(cellular number, BLUETOOTH™ etc.) and is not directional.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings:

DETAILED DESCRIPTION OF THE DRAWINGS

Figure 1:
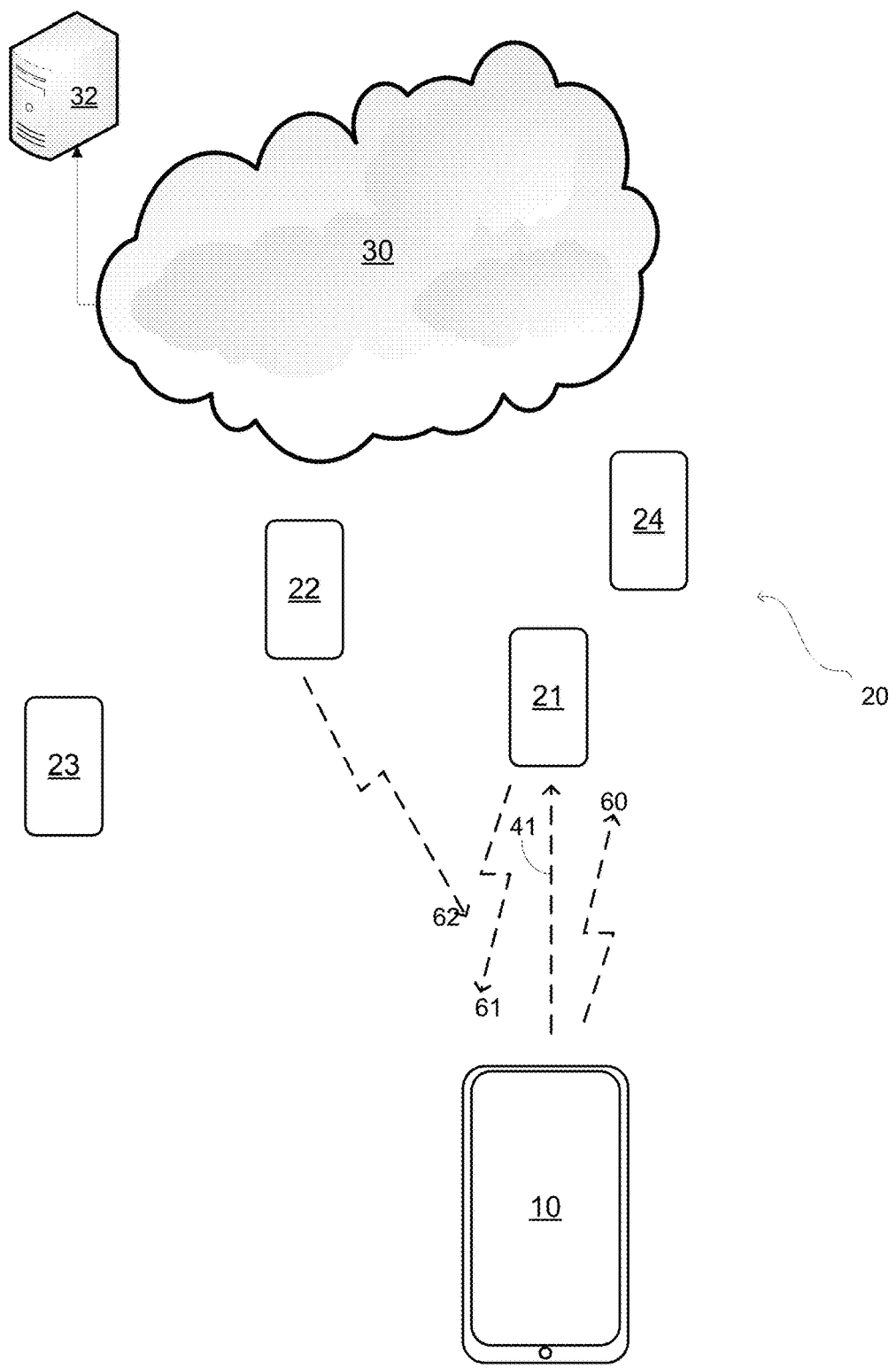
FIG. 1 is an example of a mobile communication device, other devices and a long-range network such as a cellular network that includes computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Any reference in the specification to a system should be applied mutatis mutandis to a method that can be executed by the system.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method Directional communication is a communication between devices that is based on a direction from one device to another. A directional communication link may link between devices based on the direction from one device to another.

For example—directional communication may enable a person to point his device towards another person or an object and initiate a communication channel with them.

Most of the existing wireless technologies don't enable the conduction of Directional Communication, and those who do enable it, such as IR based remote controls, require line-of-sight between the initiator's emitter and the target's receiver or large directional antennas such as RF antennas or directional microphones array.

The directional wireless communication technologies can be divided into light-based (such as lasers, IR etc.) and non-light-based (such as RF etc.).

Light-based communications include visible and invisible light in the frequency range of 400 to 800 THz (800 and 375 nm), which is unlicensed spectrum worldwide.

The smart devices' camera and flash light (LED) can also be used for directional light based communication but they also require line of sight between the two sides.

Non-light-based communications, such as radio-frequency (RF), require directional antennas if one wants a Directional Communication. A directional antenna is designed to function more effectively in some directions than in others. The purpose of that directionality is improving transmission and reception of communications and reducing interference.

Regular WI-FI™ communication is done via a base-station and therefore cannot be point to point—which means no direction. Direct WI-FI™ does not require a base-station, and can be point to point, but is also not directional as defined herein.

New emerging standard the wireless gigabyte alliance (WIGIG™) is using 60 GHz which is more directional by nature. Communication in the frequency range of 60 GHz requires line of sight and is directional and secure.

BLUETOOTH™ communication is point to point but is not directional as defined herein.

There is an unmet need to enable wireless communication between two sides, an initiator and a recipient, where at least the recipient is a stranger to the initiator, and they are located at distances between tens of centimeters and few hundreds of meters apart. This includes person to person, person to object, object to person and object to object communication, using a mobile phone, a wearable or any other such device, which incorporates multiple microphones. Communication herein means the transfer of either text, voice, image or other data.

Stranger means herein that the recipient's contact details, such as cellular number, social network profile or Bluetooth ID, are unknown to the initiator.

There is provided a Directional Communication method and system, which for current and future smart devices and wearables (or any other device that has the minimal hardware described below) does not require any additional hardware, namely it is using hardware that already exists in these devices.

Smart devices and wearables herein are any electronic devices that are able to connect, share and interact with its user and other smart devices.

Novel devices can be designed that will enable Directional Communication based on the provided method.

The suggested methods, non-transitory computer readable media that stores programs and devices can be applied in many situations, which can be divided generally into two groups: communication between strangers and the detection of the direction and/or distance to a stranger, where a stranger as defined herein.

A stranger can be a person or an object. Various examples are provided. In all of the applications mentioned herein one of the required steps is based on the measurement and analysis of the differences in sound signals time of arrival (TDOA).

Sound herein means any propagating acoustic wave.

Many devices, such as smartphones, home appliances and wearable devices, are able to transmit, receive and respond to signals such as sound (sound herein includes ultrasound signals above 20 kHz), RF and light (visible and IR). It is possible to locate all these emitters in space by analyzing the signals' times of arrival and performing triangulation or trilateration. However, since the speed of sound is so much slower than the speed of RF and light, it is easier to locate the sound speakers in space than the other emitters. The method, described in this invention to locate the other devices' speakers in space is based upon measuring and analyzing the differences in sound signals time of arrival (TDOA) as received by the device's microphones.

One way to conduct the above-mentioned analysis is correlating the signals received by one microphone to the signals received by the other microphone as a function of time.

This data can be then used for various purposes such as Directional Communication, objects locating, indoor navigation and more.

FIG. 1 illustrates a mobile communication device 10, other devices 21, 22, 23 and 24—collectively denoted 20 (such as other mobile communication devices and/or one or more fixed communication device), and a long-range network such as cellular network 30 that includes computer 32.

The user of the mobile communication device 10 may request to communicate over the cellular network 30 with any member of devices 20—such as device 21 that is located at a direction 41 from the mobile communication device 10. The user may not request to communicate with device 22 of devices 20.

Figure 2:
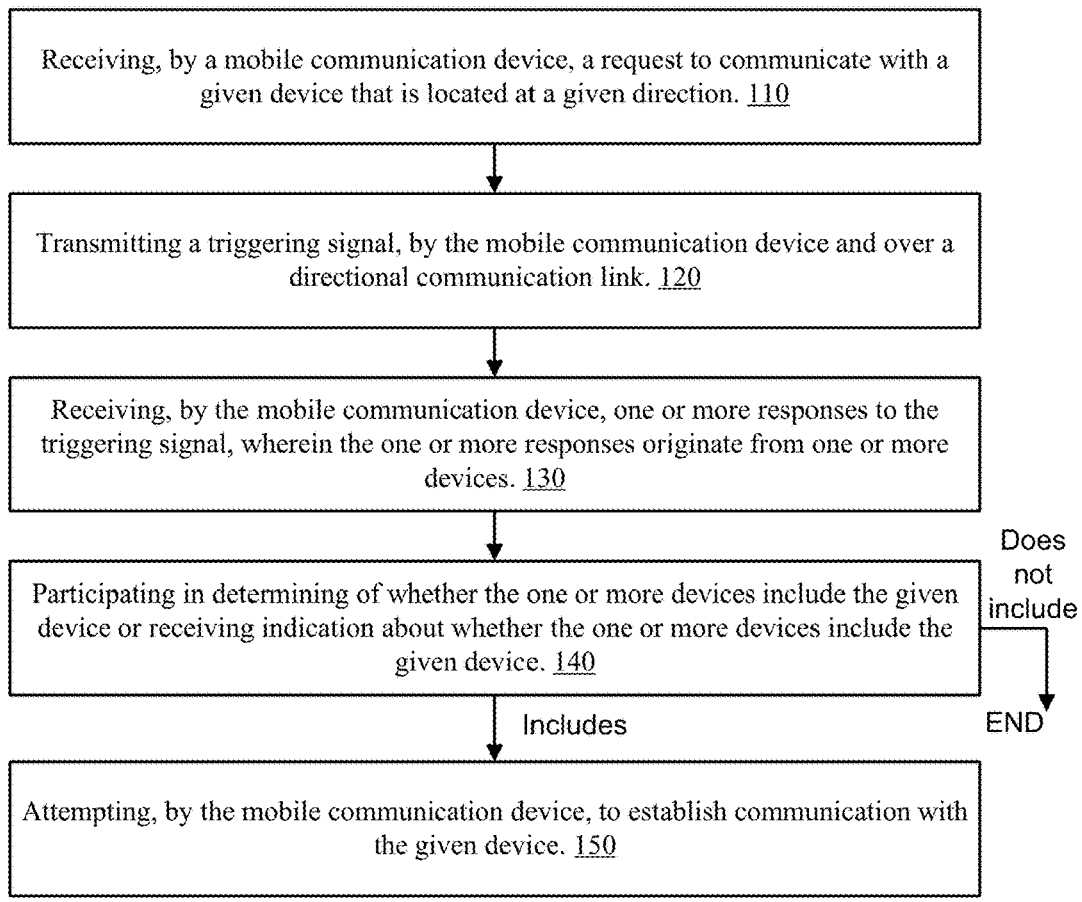
FIG. 2 is an example of a method.

FIG. 2 illustrates an example of method 100.

Method 100 may start by step 110 of receiving, by a mobile communication device, a request to communicate with a given device that is located at a given direction. The request may be a voice command, a contact between the user and an area of a touch screen or may have any other form. The mobile communication device may display to the user an image of the surrounding of the mobile communication device and the user may select a person or an object that is located at the given direction.

Step 110 may be followed by step 120 of transmitting a triggering signal, by the mobile communication device and over a directional communication link. For example, triggering signal 60 is send over a directional communication link.

The triggering signal may be conveyed over an acoustic carrier, an RF carrier, a light carrier, an infrared carrier, and the like.

Step 120 may be followed by step 130 of receiving, by the mobile communication device, one or more responses to the triggering signal, wherein the one or more responses originate from one or more devices. For example, the triggering signal 60 is received by devices 21 and 22 and responses 61 and 62 are transmitted (by devices 21 and 22 respectively) to the mobile communication device 10.

Step 130 may be followed by step 140 of participating in determining of whether the one or more devices include the given device or receiving indication about whether the one or more devices include the given device.

Step 140 may include at least one of the following:
a. Determining, by the mobile communication device, whether the one or more devices include the given device.
b. Determining of whether the one or more devices include the given device based on one or more comparisons, wherein each comparison includes comparing between receptions, by microphones of the mobile communication device, of a response from a single device of the one or more devices. For example, if device 21 responded, the direction of that device is calculated based on the reception, by the different microphones, of the response. Especially—the determining is based on the times of receptions (TDOA), by the microphones, of a response from device 21. If, devices 21 and 22 responded, the direction of each device out of devices 21 and 22 is calculated based on the reception of the response (from each one of devices 21 and 22) by the microphones of the mobile communication device.

c. Sending, by the mobile communication device, to a computer (such as computer 32), information about at least one item out of (a) the given direction, (b) an orientation of the mobile communication device, (c) time of the transmitting of the triggering signal, and (d) the one or more responses.

d. Sending, by the mobile communication device, to a computer, information about an orientation of the mobile communication device.

e. Participating with other mobile communication devices that transmitted triggering signals (for example devices 20), in a distributed determination process.

If the one or more devices do not include the given device then method 100 may end and/or having step 140 be followed by sending a failure notification to the user.

If the one or more devices do include the given device the step 140 may be followed by step 150 of attempting, by the mobile communication device, to establish communication with the given device. Step 150 may use contact information provided in a response (step 130) or may be provided in another manner (for example—from a computer such as computer 32).

The communication may be established over a non-directional link such as the cellular network and/or over a short-range link such as RFID and/or NFC.

Short-range may include communication over a distance that does not exceed 10-50 meters.

Long-range may include communication over a distance that exceeds 10-50 meters.

Devices 21 and 22 as well as mobile communication device 10 may register in advance to the directional communication service (for example by registering to a directional communication web site) or may otherwise be configured to detect the triggering device and transmit a response. The response may identify the device that sends the response. The response may be unique, may be unique within a time period, may be unique within a certain area (for example—within a cell of cellular network 30), and the like.

Although FIG. 2 illustrates a communication between the mobile communication device and a given device-method 100 may be applied for communicating between the mobile communication device and multiple other devices.

A single triggering signal can be used for communicating between the mobile communication device and one or more other devices.

Thus, method 100 may include receiving, by the mobile communication device, a request to communicate with an additional device that is located at a certain direction; transmitting an additional triggering signal, by the mobile communication device and over the directional communication link; receiving, by the mobile communication device, one or more additional responses to the additional triggering signal, wherein the one or more additional responses originate from one or more additional devices; participating in determining of whether the one or more additional devices comprise the additional device or receiving indication about whether the one or more additional devices include the additional device; and when the one or more additional devices include the additional device then attempting, by the mobile communication device, to establish communication with the additional device.

Additionally or alternatively, method 100 may include receiving, by the mobile communication device, a request to communicate with a group of devices that are located at different directions; wherein the request to communicate with the group of devices include the request to communicate with the given device; participating in determining of whether the one or more additional devices comprise any member of the group of devices or receiving indication about whether the one or more additional devices comprise any member of the group of devices; and when the one or more additional devices comprise any member of the group of devices then attempting, by the mobile communication device, to establish communication with any member of the group of devices that is included in the or more devices.

Figure 3:
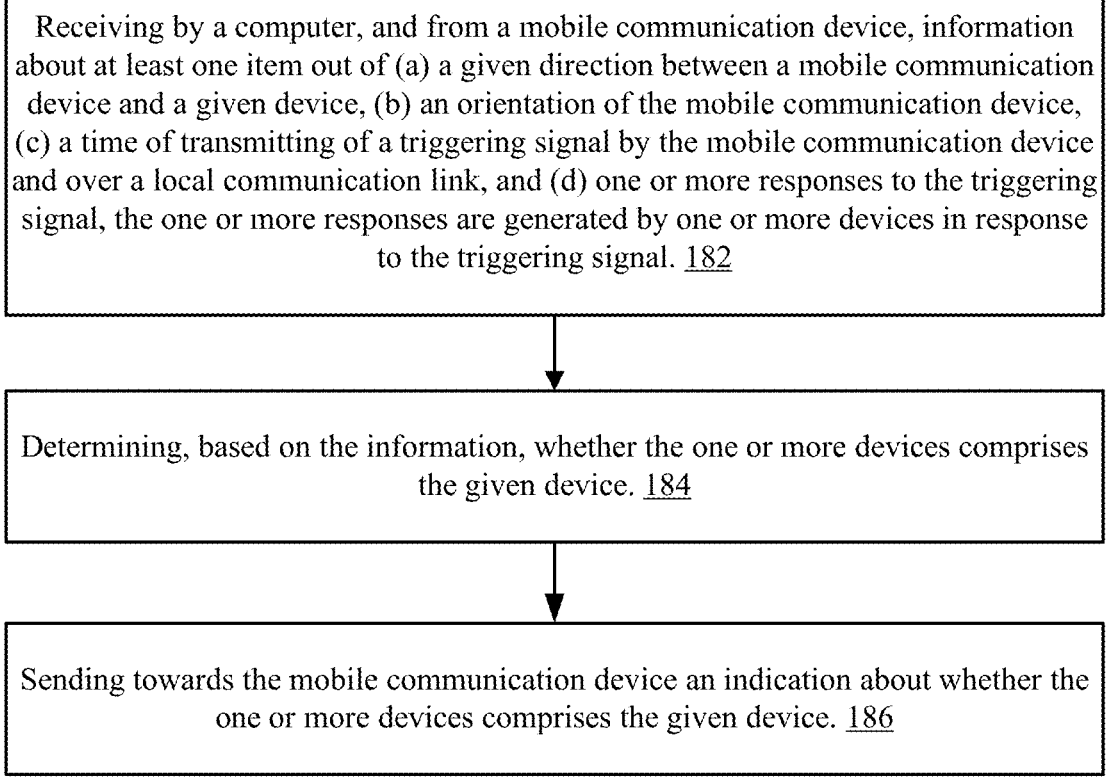
FIG. 3 is an example of a method.

FIG. 3 illustrate a method 180 managing communication, the method may be executed by a computer such as computer 32 of FIG. 1. The computer may include one or more servers, one or more desktop computers, an array of neural networks, and the like.

Method 180 may start by step 182 of receiving by a computer, and from a mobile communication device, information about at least one item out of (a) a given direction between a mobile communication device and a given device, (b) an orientation of the mobile communication device, (c) a time of transmitting of a triggering signal by the mobile communication device and over a local communication link, and (d) one or more responses to the triggering signal, the one or more responses are generated by one or more devices in response to the triggering signal.

Step 182 may be followed by step 184 of determining, based on the information, whether the one or more devices include the given device.

Step 184 may be followed by step 186 of sending towards the mobile communication device an indication about whether the one or more devices include the given device.

There may be provided a method that may include:

a. A user asks to initiate communication or position determination b. He/it requests a response.

c. Recipients respond.

d. Signals are received by the initiator.

e. Signals are distinguished.

f. Signals are directionally analyzed.

g. Communication established or position determined.

The method starts with the initiator (person or an object) aiming (pointing) his device at the designated recipient's device and triggering all compatible pre-registered devices in the initiator vicinity, either directly by sending a signal (RF, Sound or light) or by a server that knows their positions, to respond by transmitting a sound signal which can be matched to their pre-registered profile. Compatible pre-registered devices herein are those devices that have the minimally required hardware and software (which have a dedicated application, that is stored in a non-transitory computer readable medium or a manufacturer pre-installed application/program that is stored in a non-transitory computer readable medium or permit to access via their processing unit).

Figure 4:
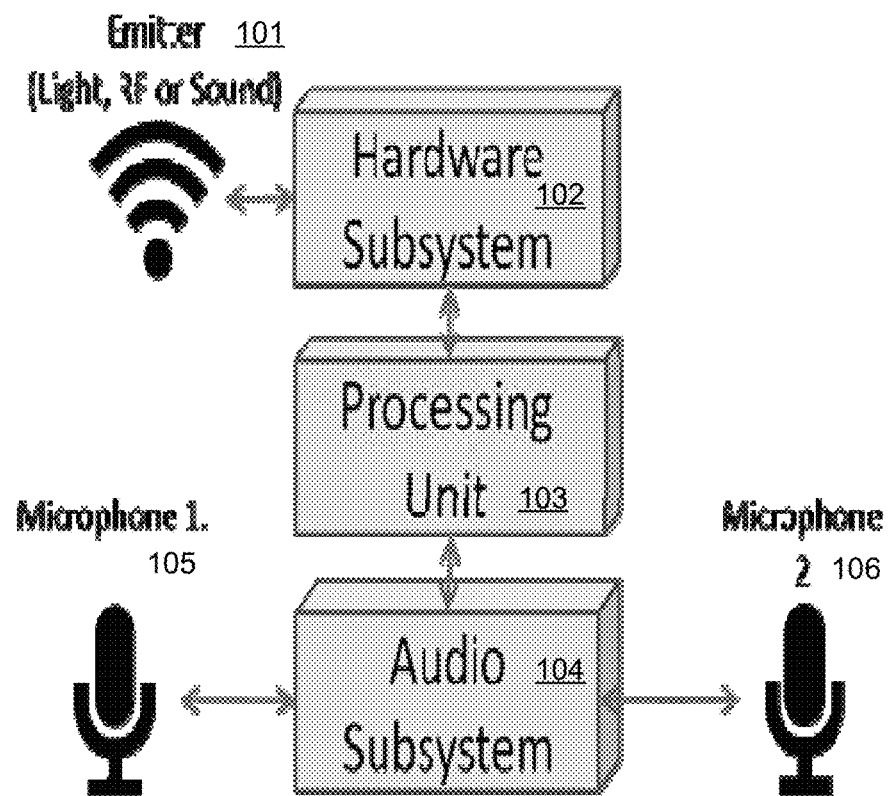
FIG. 4 is an example of an initiator device that is mobile communication device.

FIG. 4 illustrates an initiating device such as mobile communication device 10 as including one or more microphones (such as first microphone 105 and second microphone 106), emitter 101 for emitting the triggering signal, hardware system 102, processing unit 103 and audio subsystem 104.

Figure 5:
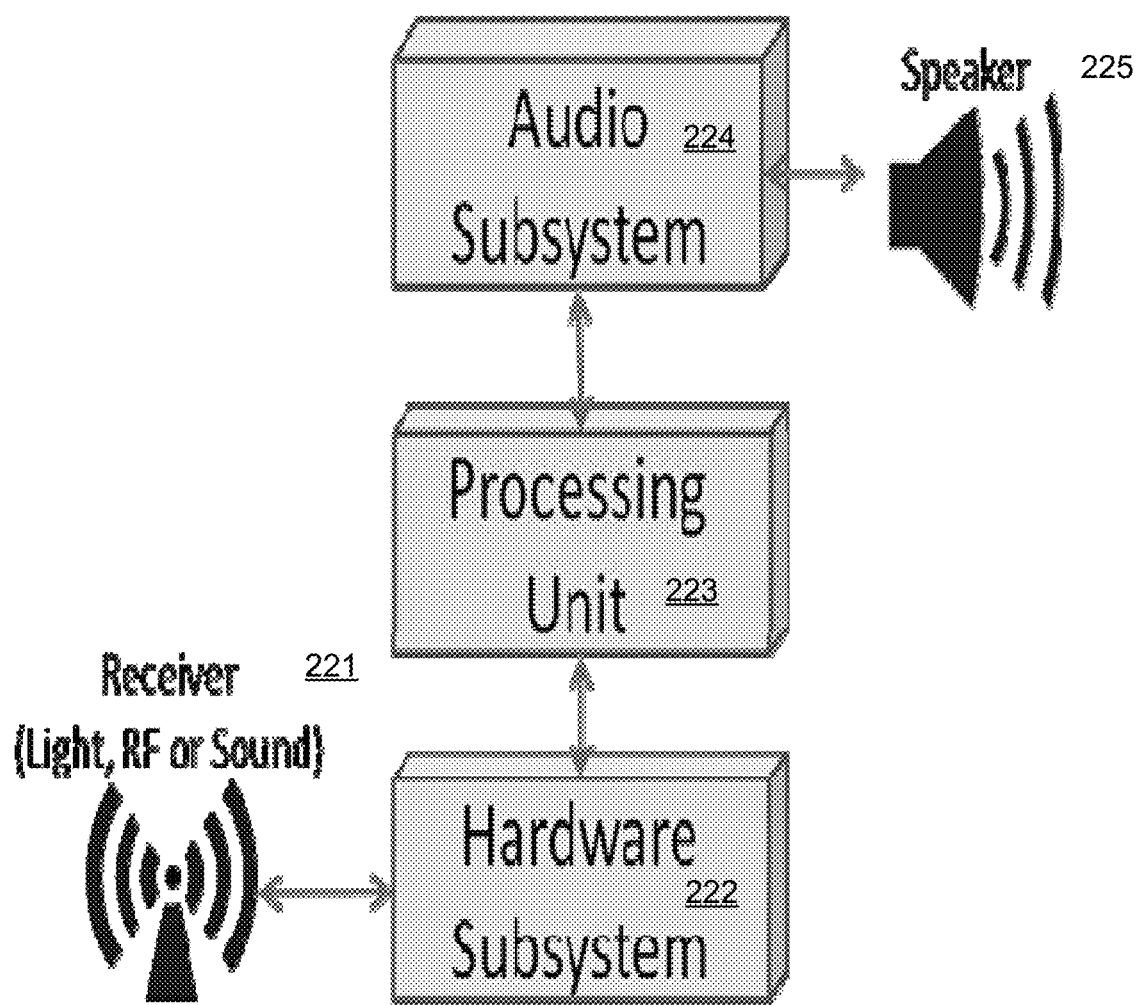
FIG. 5 is an example of a receiver device.

FIG. 5 illustrates a responding device such as device 22 as including receiver 221 (for receiving the triggering signal), a speaker 225 for transmitting a response to the triggering signal, hardware system 222, processing unit 223 and audio subsystem 224.

Figure 6:
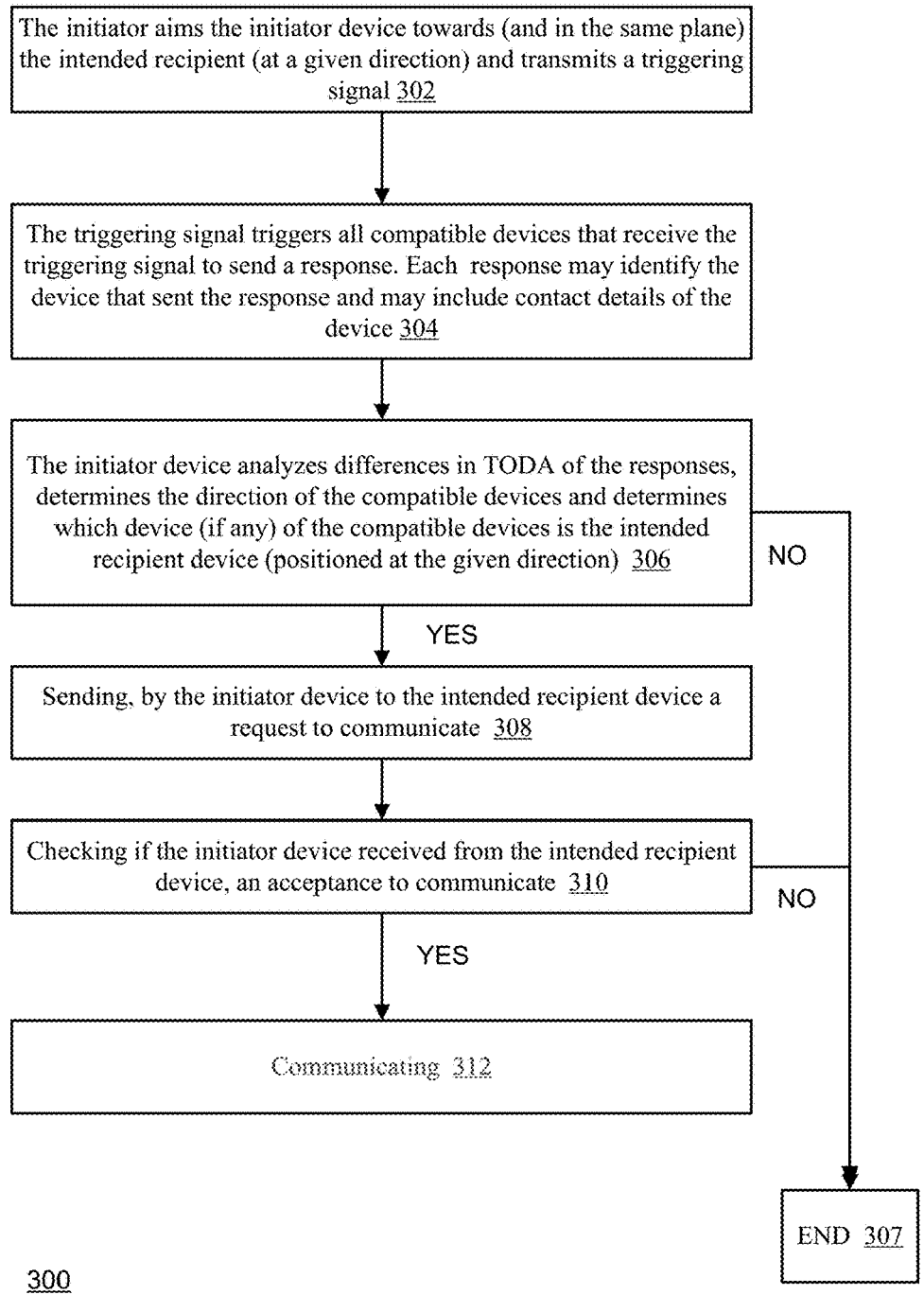
FIG. 6 is an example of a method.

FIG. 6 illustrates method 300 for communication. The method includes steps 302, 304, 306, 308, 310 and 312.

Step 302 may include having the initiator aim the initiator device towards (and in the same plane) the intended recipient (at a given direction) and transmits a triggering signa.

Step 304 may include having the triggering signal trigger all compatible devices that receive the triggering signal to send a response. Each response may identify the device that sent the response and may include contact details of the device. A compatible device is a devices that is configured to participate in the execution of method 300.

Step 306 may include having the initiator device analyze differences in TODA of the responses, determines the direction of the compatible devices and determines which device (if any) of the compatible devices is the intended recipient device (positioned at the given direction. If not—the method may end.

If yes—step 306 may be followed by step 308 that may include sending, by the initiator device to the intended recipient device a request to communicate.

Step 310 may include checking if the initiator device received from the intended recipient device, an acceptance to communicate. If not—the method may end.

If yes—step 310 may be followed by step 312 of communicating.

Figure 7:
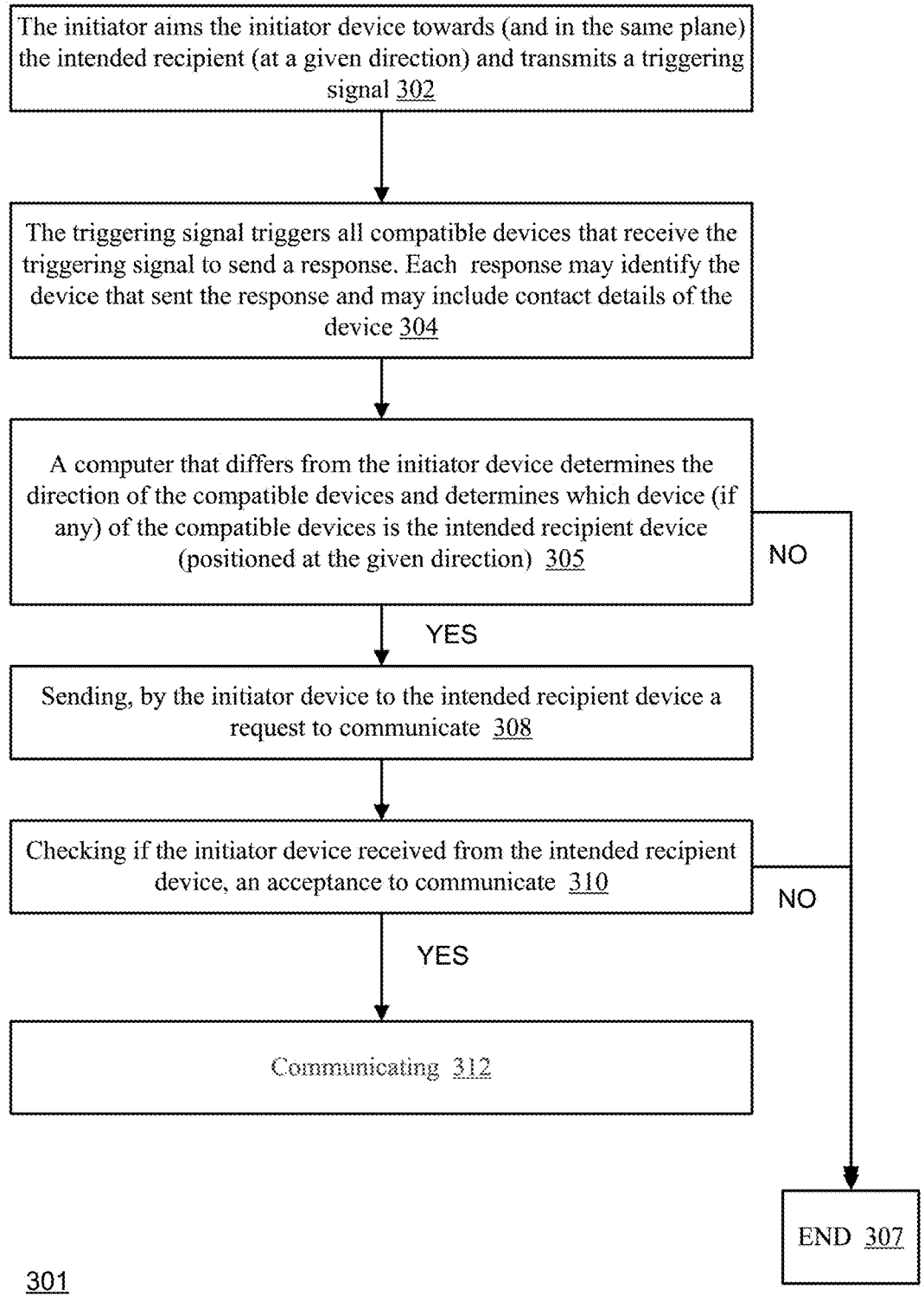
FIG. 7 is an example of three mobile communication devices and ranges of communication.

FIG. 7 illustrates method 301 for communication. The method includes steps 302, 304, 305, 308, 310 and 312.

Method 301 differs from method 300 by including—instead of step 306-step 305 of having a computer that differs from the initiator device determine the direction of the compatible devices and determines which device (if any) of the compatible devices is the intended recipient device (positioned at the given direction). If no—the method may end. If yes—step 305 is followed by step 308.

The provided Directional Communication may allow an initiator to distinguish between the desired recipient's signal and all other responding signals.

Each responding device may transmit an individual sequence of sound signals that identifies it. These signals may include the user's basic information including its communication ID (as defined by this method). This individual sequence enables to effectively filter desired signals out of all the signals received. The individual sequence of sound signals can be either static, which means it is allocated to the user once he pre-registers, or dynamic, which means that a server allocates ad hoc signals to users based on the number of different devices in a known area, once a user asks to initiate communication or position determination.

Another method to identify each of the devices is by the server arranging the devices in a queue and having them respond their sound signals one after the other, once a user initiates communication or position determination.

The initiator's device or the server to which the devices are connected to then analyzes the signals received and pairs between each device and its pre-registered profile.

The initiator's device or the server to which the devices are connected to then analyzes all the signals and compares the time they have arrived to each of the microphones embedded in it, to determine the distance and direction of all the devices that responded. It then uses a dedicated algorithm to identify which of these devices is the desired recipient.

After all signals are analyzed and their originated direction is found, the initiator's device or the server to which the devices are connected to identifies the desired target, either for communicating with or for finding its position.

As demonstrated below this is sufficient for detecting the desired recipient in the case that the initiator's device includes two or more microphones.

However, if the initiator's device includes only one microphone, the Directional Communication requires using a server (except in the case of one-on-one). Detecting the desired recipient's direction requires additional data, the azimuth formed between a reference direction (The North for example) and the line between the initiator and the desired recipient. Most smart devices include a compass that can provide this azimuth.

The rest of the data required are the possible locations of the desired recipient calculated from imaginary circles drawn around all the participating users, and their crossing points. The radii of these circles are the relative distances from one another, which can be provided by either synchronizing the clocks of all the participating users, or by sharing data regarding the timing of the transmitted signals, and the time-of-arrival (TOA) of the signals and using it for relative distances calculations or for triangulation or trilateration. Crossing of the azimuth with the possible locations gives the desired recipient's position.

Figure 8:
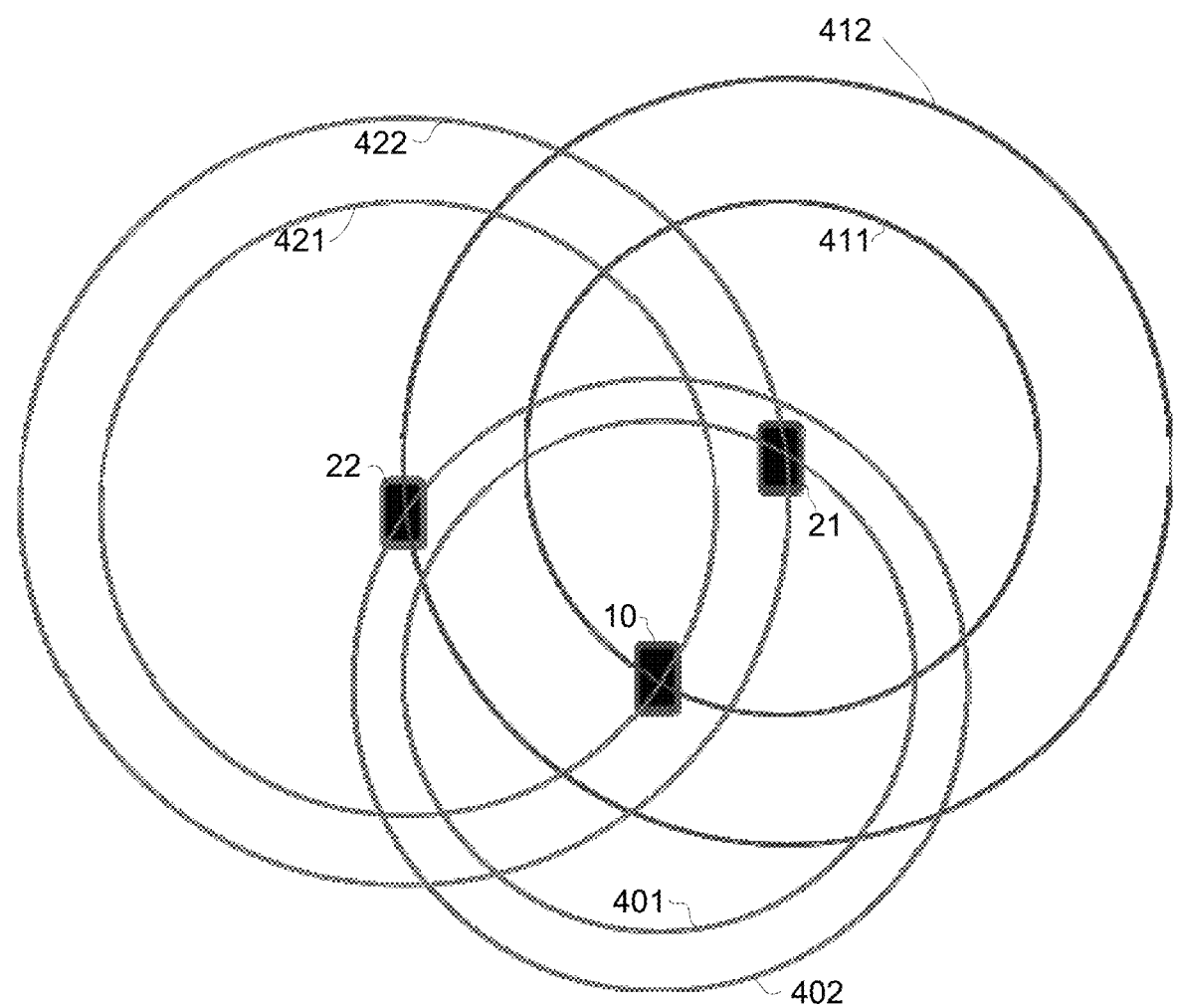
FIG. 8 is an example of a method.
Figure 9:
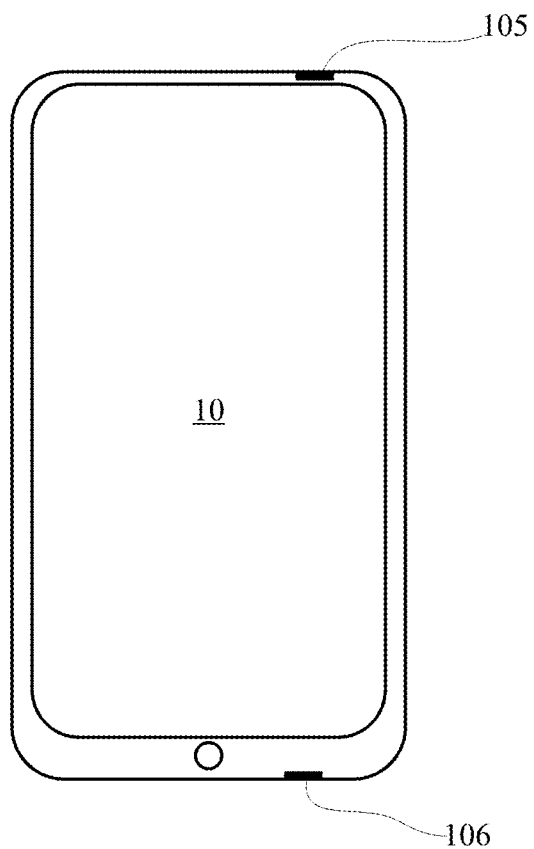
FIG. 9 is an example of a mobile communication device that includes two microphones.

FIG. 8 illustrates mobile communication device 10 that is located at the center of imaginary circles 401 and 402, device 21 that is located at the center of imaginary circles 411 and 412, as well as device 22 that is located at the center of imaginary circles 421 and 422.

After the desired target is identified, either by the initiator's device or the server to which the devices are connected to, a communication channel between the initiator device and the desired target's device can be established. This communication may include link between the devices' pre-registered profiles, utilizing previously provided identity information, and/or contact information for sending a message. The message can be a personal advertisement, a request for data, a request for chatting etc.

If the desired target (given device or user of the given device) agrees to communicate they may continue to chat, either through the server or through an existing instant messaging application.

The desired target may provide further contact information such as its cellular number, email address or social network profile.

Some of the above contact data may be transferred already in the response to the triggering signal.

The suggested method and system may be utilized in various situations such as:

Person to person communication—finding distance and direction.
  a. In the case that the initiator's device includes only one microphone, using triangulation or trilateration based on synchronized signal transmitting time and time-of-arrival data (TOA) shared between the various devices.
    i. Pre-positioning an object with known location (or using an already existing object) as a fixed recipient facilitates the analysis.
    ii. In spaces where indoor navigation exists, recipients' devices can facilitate the analysis by sharing their indoor coordinates with the initiator's device.
    iii. Repeating the process after the initiator's device is moved by known distance and direction facilitates the analysis.
  b. In the case that the initiator's device includes two microphones, using TDOA data is sufficient to find the direction, as is later demonstrated.
  c. In the case that the initiator's device includes more than two microphones, using TDOA data is sufficient to find both the direction and the distance by using triangulation. Comparing the direction found by each pair of microphones enables to find the crossing point which indicates the exact relative location.

d. Using two initiating devices both having two microphones, when the distance between these devices is known, enables to find the relative position of a recipient by triangulation.

e. When the recipients are pre-registered in a server, synchronizing their device's clocks enables to find their distances by analyzing their sound signal time of flight (TOF)

Person to person communication—Initiating communication with a specific recipient.

a. In the case that the initiator's device includes only one microphone, using triangulation or trilateration based on synchronized time-of-arrival data (TOA) shared between the various devices and the individual unique sequence of sound signals which includes sufficient contact details of the recipient.

b. In the case that the initiator's device includes two or more microphones, using TDOA data and the individual unique sequence of sound signals which includes sufficient contact details of the recipient Person to object—Calculating distance and direction.

a. In the case that the initiator's device includes only one microphone, as illustrated above.

b. In the case that the initiator's device includes two or more microphones, as illustrated above.

Person to object—Initiating communication with specific object.

a. In the case that the initiator's device includes only one microphone, as illustrated above.

b. In the case that all that is needed is to get data from the object it is possible to conduct the whole communication cycle by sound signals.

Object to person—as illustrated above.

Object to object—as illustrated above.

Sharing the data between various devices, as mentioned above, will enable cross-triangulation or trilateration which can create a network of positions of the various devices. Such a network can improve the accuracy of the positioning process.

Knowing the positions of all pre-registered users has a merit for advertisement, gaming and other applications.

Since the speed of sound, which is about 340 m/sec at sea level at room temperature, is relatively slow (radio, IR, and visible light speed is 300,000,000 m/sec) it is easier to use sound signal to measure distances between a sound emitter and a sound receiver as the time it propagates is longer.

Figure 10:
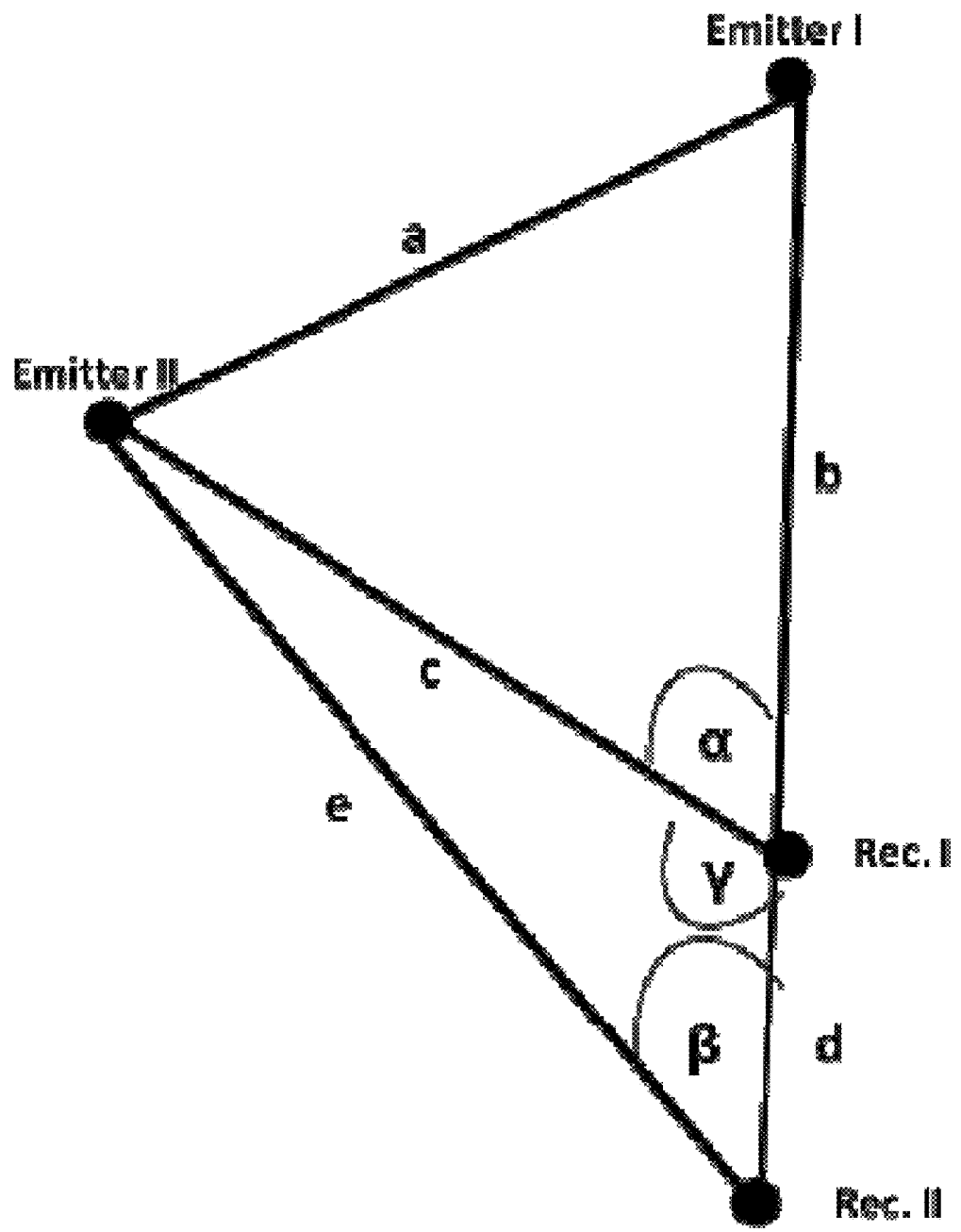
FIG. 10 is an example of relationships between directions and distances between transmitters and receivers.

It takes about 2.9 milli-second for sound to pass 1 meter, 0.29 milli-second to pass 10 cm (about the distance between two microphones in a smartphone) and 0.1 milli-second to pass 3 cm (about the distance between two microphones in a smartwatch). The two microphones are synchronized and the processors can measure these times. FIG. 10 illustrates a mobile communication device 10 that include two microphones 105 and 106 that are spaced apart from each other by about 10 centimeters.

For example, audio ADC sampling rate can be 48 kHz or even higher, which means that it is possible to measure time-of-arrival differences of about 0.02 milli-second.

By interchanging signals between time synchronized speakers and microphones, measuring the times of arrivals and employing a geometric algorithm, the location of each emitter in space is found.

This location of each emitting device can then be used for various purposes such as Directional Communication, objects and person locating, indoor navigation and more.

The minimal required hardware for this method in the initiator's device includes at least two separate microphones connected to audio subsystem and signal processing capabilities. The recipient's device must include a speaker that is capable of generating a detectable sound signal at the initiator's device.

In addition, the initiator must be able to communicate with the recipient/recipients in order to trigger them to transmit the sound signal. This primary initiation can be conducted by a variety of methods, including sound, RF or light signals, which the recipient device can detect or by sending command through a server which the devices are connected to.

The status of at least one recipient device, which can be either turned on, in standby mode, in sleep mode or in other modes, also affects the required methods to trigger the recipients' response:

a. If the at least one recipient device is turned on, any of the above mentioned communication methods can be used to trigger them to respond.

b. If their devices are on other modes, the methods that can be used must comply with the manufacturer's design. For example, some current devices have an 'Always-On' voice system that can wake up the device by a specific voice activity feature which enables them to react to voice commands. The method described in this case will use a pre-determined sound trigger signal that will be recognized by the device's 'Always-On (or Voice Trigger) subsystem and will activate their speakers.

c. The method provided holds also for devices that their 'always on' feature can be triggered by RF and/or light.

d. Sending command from the server, based on known location (either GPS based or other) to trigger recipients' response is not dependent on the status of their devices.

The method and procedure are described herein for the case of "Directional Communication" between two persons, the initiator and the recipient, and can be the same for the person to a group of persons, person to object, object to person and object to object, once the objects are provided with the minimal required hardware and software mentioned above, including sound and/or WI-FI™, and/or BLUETOOTH™ and/or light.

The following description holds for the case that the two microphones of the initiator's device are located one on the top and one on the bottom of the device:

The initiator aims its device towards and approximately in the same plane of the intended recipient's device. A clear line of sight is not mandatory. Then he triggers all the compatible pre-registered devices in the initiator vicinity, either directly by sending a signal (RF, Sound or light) or by a server that knows their positions, to send a sound signal.

The sound signals which the initiator's device receives are then analyzed either by it or by a server which it is connected to, in order to match them to their pre-registered profiles. Each responding device may transmit a unique individual sequence of sound signals that identifies itself by providing its basic information including its communication ID (as defined by this method). This individual unique sequence enables to filter out effectively desired signals out of all the signals received.

Another method to identify each of the devices is by analyzing their data in a server and pairing between them based on their personal profile.

If the initiator's device is aligned such that the line between its microphones points toward the recipient, then the analysis algorithm will look for the maximal TDOA. If the line between the initiator's device microphones will be perpendicular to the recipient's direction a minimal TDOA will be looked for.

The analysis is based on matching the time-of-arrival difference from each of the responders to the initiator's microphones. The right difference in arrival times between the two microphones is pre-defined according to the initiator device model (depends on the exact distance between the microphones in each model). The initiator's device will receive a pair of signals, one to each of its microphones, from each responder. The device or the server then calculates the time-of-arrival difference between each pair and compares it to the pre-defined time difference to check if it matches the algorithm. Only a device that is located exactly where the initiator's device is aimed at will match the required algorithm pre-defined time-of-arrival difference formula (the longest or shortest time-of-arrival difference, depends on the initiator's device alignment) and therefore could be identified out of all other devices in the area.

If it finds a match the recipient will receive a request to communicate. If he approves, a communication channel is established. This is illustrated in FIG. 6.

The initiator can include in its request to communicate his device's azimuth when directed at the recipient.

The recipient can use this azimuth to direct his device towards the initiator and identify him.

For finding the distances and directions of strangers, any of the mentioned above methods may use triangle basic rules (such as Law of Sines and the Law of Cosines).

This additional analytics may enable to detect the exact distance between each of the recipients' devices in the vicinity and their position.

Example (see also sketch 510 of FIG. 10):

If there are two emitters, one is the intended recipient (Emitter I) and the other is not (emitter II), the following data will be known:

d (distance between the receivers of the initiator's device)
b (distance of Emitter I from Receiver I)
b+d (distance of Emitter I from Receiver II)
c (distance of Emitter II from Receiver I)
e (distance of Emitter II from Receiver II.
Then, according to law of cosines:

$$e^2 = b^2 + d^2 - 2bd\cos y$$

$$T_{RecI}^{EmitterI} = \frac{b}{V} \quad T_{RecII}^{EmitterI} = \frac{b+d}{V}$$

$$T_{RecI}^{EmitterII} = \frac{c}{V} \quad T_{RecII}^{EmitterII} = \frac{e}{V}$$

$$\frac{e}{V} - \frac{c}{V} > \frac{b+d}{V} - \frac{b}{V}$$

No matter what the distance of the two emitters from the initiator is, the exact time-of-arrival difference between each of their signals to the initiator's two receivers will only match the pre-defined time-of-arrival difference to the emitter towards which the initiator's device is pointed at.

The following table presents the influence of the emitter angle in relation to the initiator's device in terms of time-of-arrival difference (TDOA) in milli-seconds between two microphones which are located 15 cm from each other for assumed sound speed of 340.29 m/s:

| Distance Angle | 3 meters | 5 meters | 10 meters | 15 meters |
|---|---|---|---|---|
| 0° (aimed at the intended recipient) | 0.4408 | 0.4408 | 0.4408 | 0.4408 |
| 10° | 0.4344 | 0.4343 | 0.4342 | 0.4342 |
| 20° | 0.4154 | 0.4150 | 0.4146 | 0.4145 |
| 30° | 0.3844 | 0.3834 | 0.3826 | 0.3823 |
| 45° | 0.3170 | 0.3149 | 0.3133 | 0.3128 |

Figure 11:
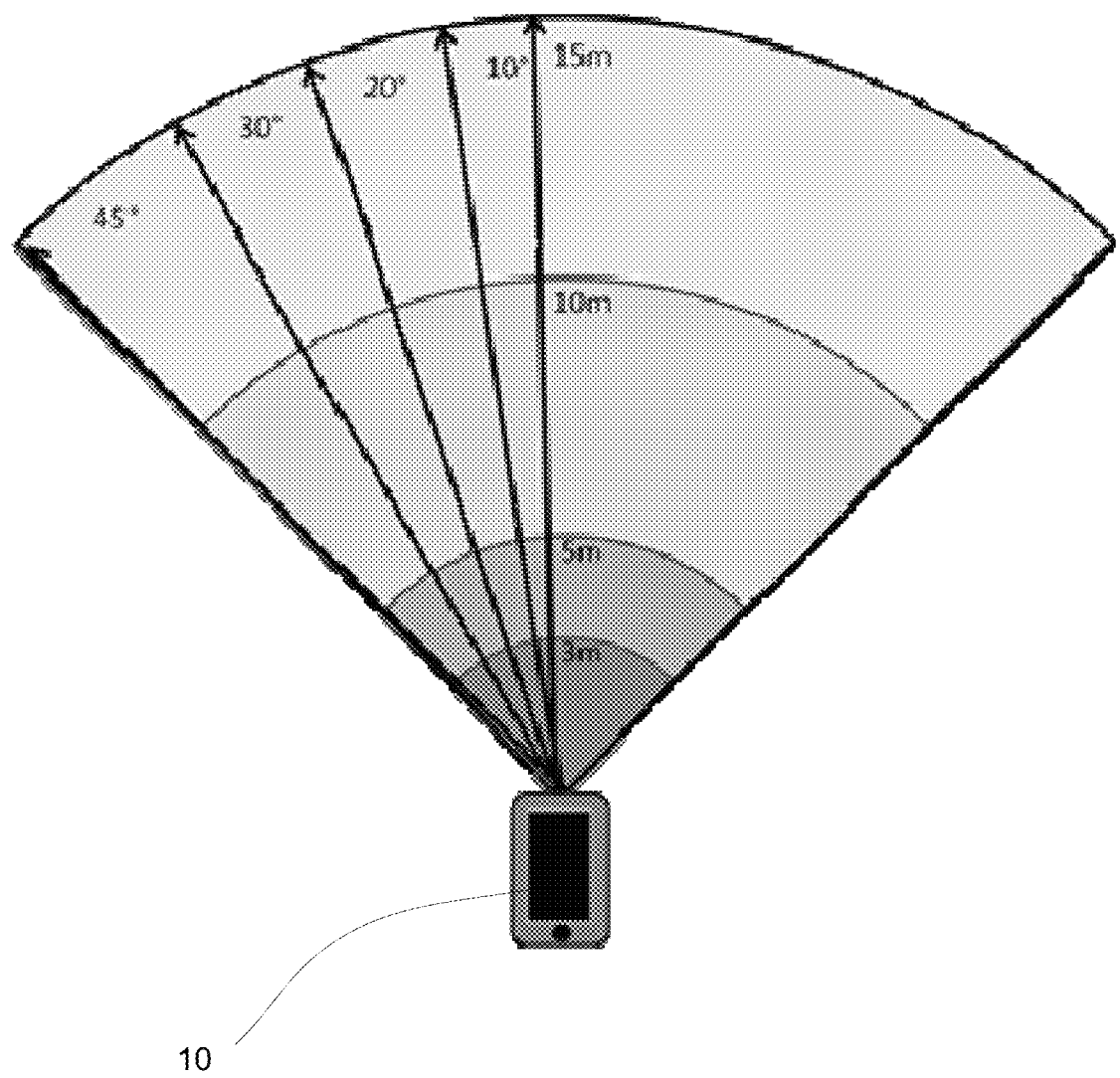
FIG. 11 illustrates an example of different directions and different distances from mobile communication device 10.

FIG. 11 illustrates different directions and different distances from mobile communication device 10.

The time-of-arrival differences given in the above table will be similar for smart glasses with two microphones located at the frame edges, shorter by about 5 times for a smart watch size device with two microphones located about 3 cm from each other and can be significantly longer for wearable device embedded in clothing.

The technology described in this patent can also be used in the automotive industry where it can be utilized for communication or command and control between objects (car to car or other object) and for communication between person to person or person to car.

Sonic transmitters and receivers used in cars to measure distances from objects can be integrated with the applications described above (i.e. communication).

Non-limiting Examples of Use

The method described herein can be applied in many situations, which can be generally either communication between strangers (either a person or an object) or the detection of the direction and/or distance to strangers (either a person or an object).

Figure 12:
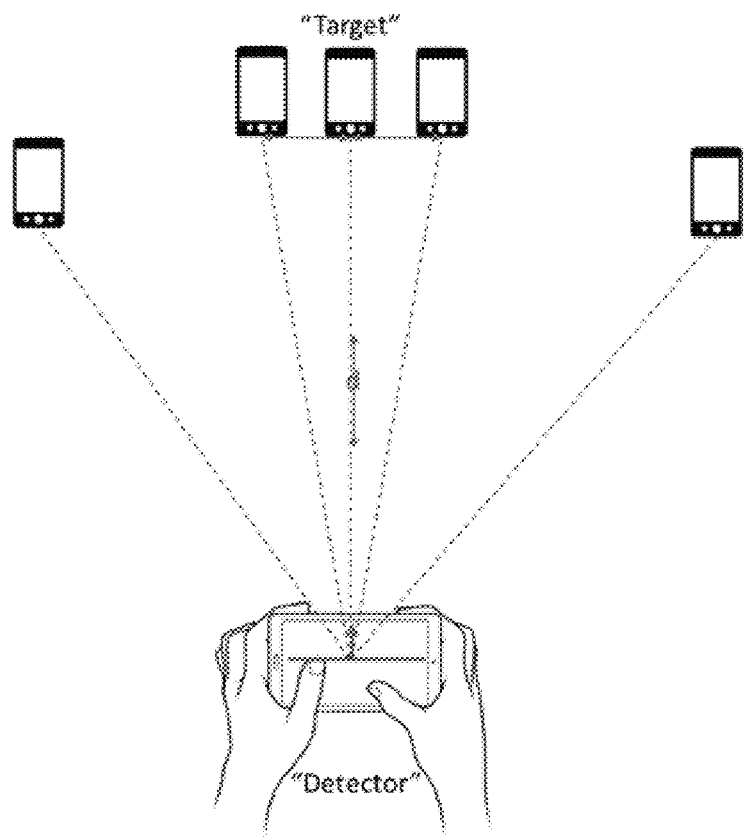
FIG. 12 illustrates an example of various devices.

One-to-one:
 a. Person-to-person.
 b. People in a coffee shop, in a pub, etc.
 c. Between drivers.
Person-to-object:
 a. Window display of objects, museum displaying objects, person to clothing object dressed or carried or wore by another person.
 b. Finding lost car in parking lot, lost keys.
 c. Remote controls for the house or industry.
Object-to-person:
 a. Window display as above but initiated by the object.
 b. Same but inside store.
 c. Security Alerts such as the detection of line crossing or perimeter crossing by a person.
 d. Directional guidance inside buildings or outdoor using a transmitting device, either an existing smart-device or a novel dedicated device, that sends sound waves that indicates its position and assist individuals who hold a smart-devices to navigate to it. This can be useful for office or apartments buildings, shopping malls, airports, hospitals, conventions etc.
Object-to-object:
 a. Security Alerts as above.
 b. Organizing objects on a line, at a given distance from each other or at another geometry.
 c. Distance to wallet checked by smartphone or other device.
 d. Between cars or between cars and traffic lights.
One-to-many:
 a. One is a person or a shop or a business sending a message to persons or objects in a specific sector (defined by a range of distances and a range of angles).
Examples of experiments conducted are provided below.
Various existing smartphone models have been used to transmit and receive different series of pre-defined sound signals composed of frequencies between 16 and 19 kHz. All were tested in ranges between 2 and 9 meters and in angles between −45 degrees to +45 degrees relative to the line of sight as described in FIG. 12. The receiver device has been positioned in a fixed location in which the line that connects its 2 microphones was perpendicular to the line of sight referred to as 0 degrees.

Various alignments of the transmitting device speaker relatively to the receiving device direction have been tested.

The signals received by the receiver device have been recorded and then analyzed using a dedicated algorithm written in MATLAB™ software installed on a laptop computer.

The following average results were received:

| Distance (in Meters) | Actual Angle (in Degrees) | Detected Angle (in Degrees) | Deviation (in Degrees) |
|---|---|---|---|
| 2 | −45 | −49.4 | 6.76 |
| 2 | 40 | 41.8 | 7.625 |
| 3 | 0 | 6.1 | 2.4 |
| 3 | 20 | 25.2 | 6.575 |
| 4 | 0 | 2.275 | 6.75 |
| 4 | 10 | 16.7 | 7.66 |
| 6.5 | −5 | −2.9 | 7.675 |
| 7 | 0 | 3.5 | 7.5 |
| 8 | 0 | −3.1 | 9.6 |
| 9 | 0 | 5.4 | 6.9 |

Another experiment was conducted in order to try to identify the directions of two different transmitters. Two smart-phones were transmitting simultaneously each a different series of pre-defined sound signals.

The signals that were recorded by the receiving smart-phone were then analyzed by a dedicated algorithm and the following results were obtained:

| | Distance (in Meters) | Angle (in Degrees) | Detected Angle (in Degrees) | Deviation (in Degrees) |
|---|---|---|---|---|
| Transmitter 1 | 2 | 20 | 28.4 | 11.3 |
| Transmitter 2 | 3 | −15 | −11 | 9.1 |

Any of the mentioned above methods may be used for one-to-one communication and/or one-to-many communication.

Any of the mentioned above methods may be used for determining location (direction and/or range) between two or more devices.

At least one of devices mentioned above may be a mobile communication device, a fixed device, a mobile phone, a smart phone, a wearable device, and the like.

The determination regarding the spatial relationship (relative direction and/or range) between devices (such as the initiator device and a responding device) may be calculated by the initiator device, by a computer that differs from the initiator device, in a centralized manner or in a distributed manner.

Any of the devices mentioned above may be operated by a human user and/or may be operated without human intervention.

Any of the methods may be used for communicating between devices of users that are known to each other or unknown to each other before the communication begins.

Any of the methods may be used for communicating between two persons who are strangers to each other, for example one person communicates with another in a bar.

Any of the methods may be used for allowing a user to receive data about an object by pointing at it, for example a person aiming his smart device at a picture in a museum or at an object in a display window and receiving data transmitted by it Any of the methods may be used for allowing an object to communicate with a user who's positioned in a specific direction relatively to it, for example a location related advertisement.

Any of the methods may be used for allowing a user to communicate with a group of people located within a pre-defined span, for example sending data only to people located on one side of a meeting room Any of the methods may be used for allowing an object to communicate with a group of people located in a specific space, for example a business sends advertisements or special offers to all customers located within it.

Any of the methods may be used for allowing an object to communicate with a part of a group of people located in a specific space, based on the profiles as known by their pre-registry.

Any of the methods may be used for providing content such as advertisements or music to the relevant crowd profile.

Any of the methods may be used for providing direction information for a meeting between two persons, for example in a conference hall or in an airport.

Any of the methods may be used for directing an object for example a drone towards a person.

Any of the methods may be used for guiding a person to a specific location, for example indoor navigation in an office building, airport, hospital etc.

Any of the methods may be used for guiding an object to the location of another object, for example guiding a robot to its docking station Any of the methods may be used for guiding a group of people to arrive to a person's location, for example a tour guide who gathers his group.

Any one of method 100, 300 and 301 may be initiated by an initiator device (such as a mobile communication device or any other wireless communication device)—even without human intervention.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for comprising:
    requesting, from a server of a communications network, by an initiating device in said communications network, identification information with respect to a target device, wherein said initiating device is oriented in the direction of said target device;
    causing, by said server, one or more devices in said communications network that are located within a specified distance from said initiating device, to transmit a unique identification signal;

receiving, by said initiating device, said unique identification signals, determining, by said server, which of the one or more devices is the target device, based on a difference in a time of said receiving by said initiating device of each of said unique identification signals; and providing, by said server, to said initiating device, identification information with respect to said target device.

2. The method according to claim 1, wherein the unique identification signals are conveyed over an acoustic carrier.

3. The method according to claim 1, wherein the unique identification signals are conveyed over a light carrier.

4. The method according to claim 1, wherein the unique identification signals are conveyed over a radio frequency carrier.

5. The method according to claim 1, wherein the unique identification signals are conveyed over an infrared carrier.

6. The method according to claim 1, further comprising attempting, by the initiating device, to establish long-range communication with the target device, based on said identification information.

7. The method according to claim 1, further comprising attempting, by the initiating device, to establish short-range communication with the target device, based on said identification information.

8. The method of claim 1, wherein said causing by said server is based, at least in part, on a known location of each of said one or more devices.

9. The method of claim 1, wherein said initiating device comprises two or more microphones, and said determining is based on a difference in a time of said receiving of said unique identification signals by each of said two or more microphones.

10. The method of claim 1, wherein said determining is further based on a known azimuth of said initiating device.

11. The method of claim 1, wherein said unique identification signals are allocated to each of the one or more devices by said server.

* * * * *